E. BAUM & M. MUGDAN.
PROCESS OF PREPARING ACETALDEHYDE.
APPLICATION FILED JULY 25, 1913.
1,107,019.
Patented Aug. 11, 1914.
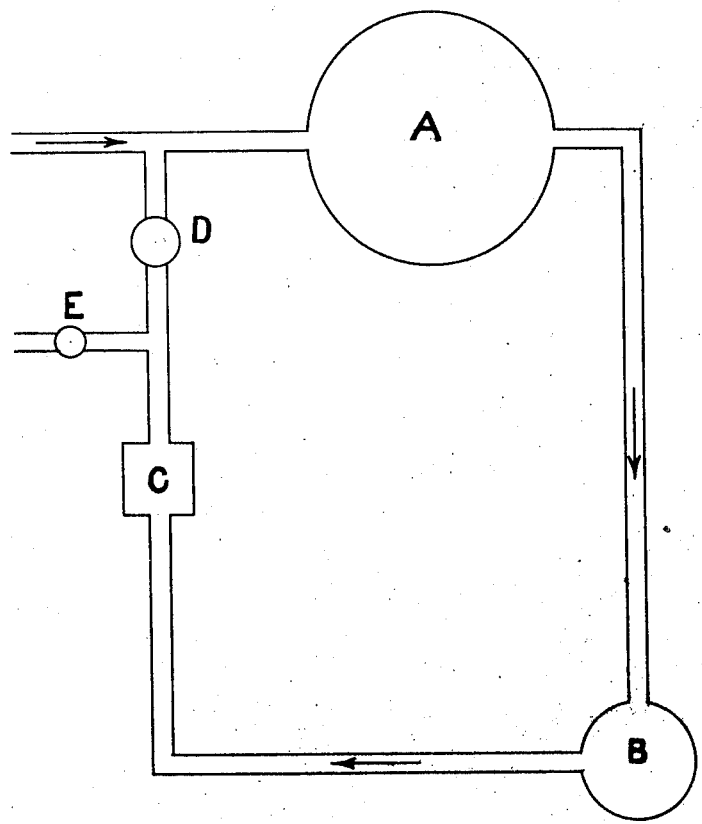
Witnesses
Howard F. Costello
Ross J. Woodward
Inventors
Erich Baum
Martin Mugdan
their Attorney

UNITED STATES PATENT OFFICE.

ERICH BAUM AND MARTIN MUGDAN, OF NUREMBERG, GERMANY, ASSIGNORS TO CONSORTIUM FÜR ELEKTROCHEMISCHE INDUSTRIE G. M. B. H., OF NUREMBERG, GERMANY.

PROCESS OF PREPARING ACETALDEHYDE.

1,107,019.  Specification of Letters Patent.  Patented Aug. 11, 1914.

Application filed July 25, 1913. Serial No. 781,209.

*To all whom it may concern:*

Be it known that we, ERICH BAUM and MARTIN MUGDAN, subjects of the German Emperor, residing at Nuremberg, Germany, have invented certain new and useful Improvements in Processes of Preparing Acetaldehyde, of which the following is a specification.

In the preparation of acetaldehyde from acetylene by means of solutions of mercury-salts we have found that when using pure acetylene the speed of reaction slackens after some time, even when the liquid is well stirred. This was proved to be caused by the gathering of acetaldehyde in the gas-space of the reaction-vessel. Now we have found that this slackening of reaction may be avoided, if a surplus of acetylene is allowed to permanently pass through the reaction-apparatus or advantageously the liquid contained therein, and then leading this surplus of acetylene through an apparatus in which the acetaldehyde that is dissolved or suspended in the gas is separated, and finally introducing the acetylene thus for the most part freed from acetaldehyde into the reaction-apparatus again. In this manner a much quicker working than without circulation of the gas can be achieved.

An advantageous disposition of the plant is shown in the accompanying diagrammatic view, in which—

A is the reaction-vessel, B an apparatus for the condensation or absorption of the aldehyde, C the circulating pump, D a water-closing and E a tap for the temporary removal of the impurities of the acetylene.

This proceeding is specially advantageously carried out, when acetaldehyde is to be in a continuous way prepared by introducing the acetylene into the liquid containing the mercury salt and keeping it at a high temperature at which the acetaldehyde distils off as it is formed. Such a proceeding has been for instance described in the United States application No. 755,238, which is characterized by using a solution of sulfuric acid containing mercury-oxids, the concentration of which is not higher than six per cent. The absorption of acetylene in this process may be considerably accelerated by circulation. When circulating the acetylene as above described, it is even possible to work with a liquid containing more than six per cent. of sulfuric acid, a proceeding, very advantageous to get a high speed of absorption. When using an acid of high concentration without circulation of the acetylene, large quantities of resin are easily formed by the action of acid on the acetaldehyde dissolved in the liquid. When, however, the acetylene is at the same time circulating through the liquid in the manner described above, not only the speed of absorption increases but at the same time the percentage of acetaldehyde in the liquid is so much lowered that even using a rather strong acid, the generation of resin is prevented or considerably diminished. By comparative experiments we could show that under the same conditions without circulating the acetylene a dark coloring of the liquid and generation of resin takes place, the liquid containing four per cent. of acetaldehyde, while with circulation the liquid remains clear, no generation of resin takes place and the solution contains less than one per cent. of acetaldehyde.

We declare that what we claim is:

1. The process for the preparation of acetaldehyde which comprises causing an excess of acetylene to interact with a solution of a mercury salt, transporting from the sphere of reaction part of the acetaldehyde so formed in said excess of acetylene, separating said transported acetaldehyde from said excess of acetylene and causing said acetylene thus freed from acetaldehyde to interact again with a solution of a mercury salt.

2. The process for the preparation of acetaldehyde which comprises passing an excess of acetylene through a solution of a mercury salt, transporting from the sphere of reaction part of the acetaldehyde so formed in said excess of acetylene, separating said transported acetaldehyde from said excess of acetylene and again passing said acetylene thus freed from acetaldehyde through a solution of a mercury salt.

3. The process for the manufacture of acetaldehyde which comprises circulating an excess of acetylene through a closed reaction system in which said excess of acetylene interacts with a solution of mercury salt forming acetaldehyde in one region of said reaction system and in which part of the acetaldehyde thus formed is separated from said excess of acetylene in another region of said reaction system.

4. The process for the preparation of acetaldehyde which comprises causing an excess of acetylene to interact with a hot acid solution of a mercury salt, transporting from the sphere of reaction part of the acetaldehyde so formed in said excess of acetylene, separating said transported acetaldehyde from said excess of acetylene and causing said acetylene thus freed from acetaldehyde to interact again with a hot acid solution of a mercury salt.

5. The process for the manufacture of acetaldehyde which comprises circulating an excess of acetylene through a closed reaction system in which said excess of acetylene interacts with a hot acid solution of mercury salt forming acetaldehyde in one region of said reaction system and in which part of the acetaldehyde thus formed is separated from said excess of acetylene in another region of said reaction system.

6. The process for the preparation of acetaldehyde which comprises causing an excess of acetylene to interact with a solution of a mercury salt, transporting from the sphere of reaction part of the acetaldehyde so formed in said excess of acetylene, separating said transported acetaldehyde from said excess of acetylene and causing said acetylene thus freed from acetaldehyde to interact again with a solution of a mercury salt, the temperature of reaction being such that unfavorable by-products would be produced if said acetaldehyde were allowed to remain in the solution.

7. The process for the preparation of acetaldehyde which comprises causing an excess of acetylene to interact with a solution of a mercury salt, transporting from the sphere of reaction part of the acetaldehyde so formed in said excess of acetylene, separating said transported acetaldehyde from said excess of acetylene and causing said acetylene thus freed from acetaldehyde to interact again with a solution of a mercury salt, the temperature and composition of the solution being such that unfavorable by-products would result if said acetaldehyde were allowed to remain in the solution.

In testimony whereof we affix our signatures in presence of two witnesses.

ERICH BAUM.
MARTIN MUGDAN.

Witnesses:
EUGEN GALITZENSTEIN,
MARTIN ERHARD.